United States Patent
Swank

(10) Patent No.: US 8,074,604 B2
(45) Date of Patent: Dec. 13, 2011

(54) AGGLOMERATED ANIMAL LITTER AND MANUFACTURING PROCESS FOR THE SAME

(75) Inventor: Richard B. Swank, Swanton, OH (US)

(73) Assignee: The Andersons, Inc., Maumee, OH (US)

( * ) Notice: Subject to any disclaimer, the term of this patent is extended or adjusted under 35 U.S.C. 154(b) by 1648 days.

(21) Appl. No.: 10/990,891

(22) Filed: Nov. 17, 2004

(65) Prior Publication Data

US 2005/0132968 A1     Jun. 23, 2005

Related U.S. Application Data

(60) Provisional application No. 60/520,796, filed on Nov. 17, 2003.

(51) Int. Cl.
*A01K 29/00* (2006.01)
(52) U.S. Cl. ........................................ 119/171
(58) Field of Classification Search .................. 119/171, 119/172, 173
See application file for complete search history.

(56) References Cited

U.S. PATENT DOCUMENTS

| | | | | |
|---|---|---|---|---|
| 3,789,797 A * | 2/1974 | Brewer | .......... | 119/173 |
| 4,206,718 A * | 6/1980 | Brewer | .......... | 119/171 |
| 4,258,660 A * | 3/1981 | Pris et al. | ......... | 119/171 |
| 4,296,709 A * | 10/1981 | Schulein, Jr. | ......... | 119/171 |
| 4,821,677 A * | 4/1989 | Harrison | ......... | 119/173 |
| 5,000,115 A * | 3/1991 | Hughes | ......... | 119/173 |
| 5,041,410 A * | 8/1991 | Ivie | ......... | 502/401 |
| 5,062,954 A * | 11/1991 | Leedy et al. | ......... | 210/502.1 |
| 5,152,250 A * | 10/1992 | Loeb | ......... | 119/171 |
| 5,183,010 A * | 2/1993 | Raymond et al. | ......... | 119/172 |
| 5,193,489 A * | 3/1993 | Hardin | ......... | 119/173 |
| 5,195,465 A * | 3/1993 | Webb et al. | ......... | 119/172 |
| 5,207,389 A * | 5/1993 | Hall et al. | ......... | 241/3 |
| 5,216,980 A * | 6/1993 | Kiebke | ......... | 119/173 |
| 5,361,719 A * | 11/1994 | Kiebke | ......... | 119/171 |
| 5,542,374 A * | 8/1996 | Palmer, Jr. | ......... | 119/173 |
| 6,030,565 A | 2/2000 | Golan | ......... | 264/117 |
| 6,053,125 A | 4/2000 | Kory et al. | ......... | 119/171 |
| 6,206,947 B1 * | 3/2001 | Evans et al. | ......... | 71/63 |
| 6,582,637 B1 | 6/2003 | Phinney | ......... | 264/117 |
| 2001/0042494 A1 | 11/2001 | Welshimer et al. | ......... | 106/772 |

* cited by examiner

*Primary Examiner* — David Parsley

(74) *Attorney, Agent, or Firm* — Patent Procurement Services

(57) ABSTRACT

An animal litter is provided that includes a sorbent granule composed of granule particulate that is able to pass −20 screen sieve and a binder such that greater than 90% of said granules have a size of between −5 and +60 screen sieve. The granule has an oil coating thereon. An animal litter is produced by milling sorbent material to a particulate size such that greater than 90% by weight of said particulate is −20 screen sieve size or finer. The sorbent material is then agglomerated to the milled particulate to a granule size of between −5 and +60 screen sieve with a binder. The granule is then coated with an oil. Extrusion represents a preferred mode of agglomeration.

12 Claims, No Drawings

AGGLOMERATED ANIMAL LITTER AND MANUFACTURING PROCESS FOR THE SAME

RELATED APPLICATIONS

This application is a non-provisional application claiming priority of U.S. Provisional Application 60/520,796 filed Nov. 17, 2003, the contents of which are incorporated herein by reference.

FIELD OF THE INVENTION

The invention in general relates to an animal litter and process for the manufacture thereof, and in particular to an animal litter formed from an agglomerated biomass and the manufacture thereof.

BACKGROUND OF THE INVENTION

The production of animal litter from various mineral and biomass granular materials that are decorated with urine-activated clumping agents is well known to the art. Representative examples are found in U.S. Pat. Nos. 5,458,091 and 6,053,125. While such animal litter products have generally been effective, the generally modest urine absorption by a base granule has meant that urine entrainment has had to occur through the wetting and activation of the surface decorating clumping agent. This mechanism results in a less efficient use of litter than would otherwise be obtainable provided the base granule was urine absorbent.

Since conventional animal litters are formed from a large granule decorated with clumping agent, granule irregularity in both shape and size tends to create tracking of the resulting litter by an animal after usage in addition to dust formation associated with granule bumping during transport. A still further limitation of conventional animal litter products is that the typical granule size decorated with clumping agent forms a mass that is unsuitable for disposal in most septic systems and therefore must be handled as solid waste. Thus, there exists a need for an animal litter product where the base granule is formed from agglomerated finer particulate in order to overcome the limitations of the prior art, such litter produced by commercially practical methodology.

SUMMARY OF THE INVENTION

An animal litter is provided that includes a sorbent granule composed of granule particulate that is able to pass −20 screen sieve and a binder such that greater than 90% of said granules have a size of between −5 and +60 screen sieve. The granule has an oil coating thereon. An animal litter is produced by milling sorbent material to a particulate size such that greater than 90% by weight of said particulate is −20 screen sieve size or finer. The sorbent material is then agglomerated to the milled particulate to a granule size of between −5 and +60 screen sieve with a binder. The granule is then coated with an oil. Extrusion represents a preferred mode of agglomeration.

DETAILED DESCRIPTION OF THE INVENTION

The present invention has utility as an animal litter operative to absorb animal urine. A base litter granule is formed through a pan granulation method and entails forming a base material to a −20 screen sieve or finer and thereafter adding a binder to create an agglomerated base granule with a sieve size where greater than 80% of the resulting granules are between −5 and +60 screen sieve. Various additives are readily intermixed in the base litter granule or used to decorate the granule surface.

According to the present invention, the litter base granule material is initially cleaned and dried and milled to a size where greater than 90% by weight of the material is −20 screen sieve or finer. Preferably, the granule feedstock is milled to a size distribution where greater than 90% by weight of the material is greater than −40 screen sieve size or finer. Most preferably, 90% by weight of the granule feedstock is milled to between −20 and −200 screen sieve size. As used herein, screen sieve size, unless otherwise noted, refers to U.S. standard sieve sizes. Granule feedstocks operative herein are recognized to include those conventional to the art. Representative feedstocks operative in the present invention illustratively include corncob; bentonite; diatomaceous earth; attapulgite; montmorillonite; cellulosic plant stalks, husks and hulls; and combinations thereof. Preferably, the granule feedstock is biodegradable. More preferably, the granule feedstock is corncob.

Milling a granule feedstock to the above size distributions is readily accomplished with a commercially available milling machine, hammer mill, pin mill, knife mill, air mill, cryogenic mill, or pulverizer. A Champion hammer milling machine (Waterloo, Iowa) is representative of such a milling machine. The milled granular feedstock is then directed to a pan agglomerator in concert with a binder. The milled granular feedstock is delivered to the pan agglomerator by way of a conventional conveyance system that lessens dust production. Upon mixing the milled granule feedstock with a binder, the moisture content is controlled so as to achieve a granule size where greater than 90% by weight of the granules are between −5 and +60 screen sieve.

Alternatively, the milled granular feedstock is delivered to an extruded operating with at least one suitably sized die opening. The extruded rod of feedstock is cut into cylindrical granules and dried to achieve a granule size where greater than 90% by weight of the granules are between −5 and +60 screen sieve.

The binder is present in amounts ranging from 0.5% to 95% by weight of the total dry weight of the granule. More preferably, the binder is present in amounts ranging from 1% to 75% by weight of the total dry weight of the granule. Still more preferably, the binder is present in amounts ranging from 2% to 20% by weight of the total dry weight of the granule. Most preferably, the binder is present in amounts ranging from 3% to 10% by weight of the total dry weight of the granule. Illustrative examples of binders operative herein are carbohydrates such as monosaccharides, disaccharides, oligosaccharides and polysaccharides; proteins; lipids; glycolipid; glycoprotein; lipoprotein; and combinations and derivatives of these. Specific carbohydrate binders illustratively include glucose, mannose, fructose, galactose, sucrose, lactose, maltose, xylose, arabinose, trehalose and mixtures thereof such as corn syrup; celluloses such as carboxymethylcellulose, ethylcellulose, hydroxyethylcellulose, hydroxymethylethylcellulose, hydroxyethylpropylcellulose, methylhydroxyethyl-cellulose, methylcellulose; starches such as amylose, seagel, starch acetates, starch hydroxyethyl ethers, ionic starches, long-chain alkyl starches, dextrins, amine starches, phosphate starches, and dialdehyde starches; plant starches such as corn starch and potato starch; other carbohydrates such as pectin, amylopectin, xylan, glycogen, agar, alginic acid, phycocolloids, chitin, gum arabic, guar gum, gum karaya, gum tragacanth and locust bean gum; complex organic substances such as lignin and nitrolignin; derivatives of lignin such as lignosulfonate salts illustratively including calcium lignosulfonate and sodium lignosulfonate and complex carbohydrate-based compositions containing organic and inorganic ingredients such as molasses. Suitable protein binders illustratively include soy extract, zein, protamine, collagen, and casein. Binders operative herein also include synthetic organic polymers capable of promoting or producing cohesion of methylene urea oligomer fines and these illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. In a preferred embodiment, the binder is calcium lignosulfonate, molasses, a liquid corn starch, a liquid corn syrup or a combination thereof.

It is appreciated that in addition to the milled granule feedstock, various additives can be incorporated into a litter granule according to the present invention. These additives illustratively include a colorant, a fragrance, an acid neutralizing agent, and a desiccant. When present, a colorant or fragrance is typically present from 1 ppm to 10 dry weight percent of a granule. When present, an acid neutralizing agent is typically present from 0.05 to 10 dry weight percent of a granule. When present, a desiccant is typically present from 0.05 to 10 dry weight percent of a granule.

The resultant granule is then coated with an oil to facilitate the subsequent adherence of a clumping agent. In addition, the oil is operative to lessen dust formation during subsequent handling, packaging and usage. Oils operative herein illustratively include mineral oil, kerosene, edible oil, paraffin distillates, naphthalene distillates, and combinations thereof. Preferably, the oil is added to fully coat the litter granules. Typically, the oil is added to the granules in an amount ranging from 0.05 to 10 total weight percent of the granules obtained from the pan agglomerator or sprayed onto extrudate from an extruder die. More preferably, the oil is present from 3 to 8%. Typically, the oil is added to the litter granules in a conventional fluidizing mixer; however, it is appreciated that there are a variety of conventional techniques by which granules can be coated by an oil according to the present invention. These techniques illustratively include spray coating and dip coating.

While the resultant granule exhibits greater size uniformity, moisture absorption, less dust and animal tracking than a conventional animal litter at this point in the process, as well as being amenable to disposal in a wastewater septic system, it is preferred that the litter produced according to the present invention further include a clumping agent adhered to the granule surface. A clumping agent according to the present invention is present as a particle decorating the surface of the litter granule. Clumping agents operative herein illustratively include gums such as guar, arabic, karaya, tragacanth and locust bean; celluloses such as corn syrup; celluloses such as carboxymethylcellulose, ethylcellulose, hydroxyethylcellulose, hydroxy-methylethylcellulose, hydroxyethylpropylcellulose, methylhydroxyethyl-cellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch. Typically, the clamping agent is added in the range of 0.05 to 30 total weight percent relative to the oil coated litter granules. More preferably, the clumping agent is added in a range of from 3 to 10 total weight percent. Most preferably, the clumping agent particles have a size distribution such that greater than 90% of the clumping agent particles are −20 screen sieve or finer.

Guar gum represents a preferred clumping agent. Guar gum is preferably introduced as a solution having a viscosity of greater than 3,000 centipoise in a 1% aqueous solution after stirring for 24 hours.

It is appreciated that the clumping agent need not be present to attain an operative animal litter. Additionally, a clumping agent present at the lower ranges contemplated results in a more readily crumbled clump, whereas greater amounts of clumping agent tend towards rock-like clumps.

Those patents mentioned herein are intended to be incorporated by reference to the same extent as if each individual patent was explicitly and individually incorporated by reference.

It is recognized that various modifications will become apparent to one of skill in the art upon reading the above specification. Those modifications that retain the spirit of the invention are intended to be encompassed by the appended claims.

The invention claimed is:

1. An animal litter comprising:
   a plurality of sorbent granules each of said plurality of sorbent granules comprising granule particulate that is 90% by weight or more able to pass −20 screen sieve and a binder such that greater than 90% of said granules have a size of between −5 and +60 screen sieve; and
   an oil coating on each of said plurality of sorbent granules.

2. The animal litter of claim 1 wherein said granule particulate is selected from the group consisting of: corncob; bentonite; diatomaceous earth; attapulgite; montmorillonite; cellulosic plant stalks, husks and hulls.

3. The animal litter of claim 1 wherein said granule particulate is corncob.

4. The animal litter of claim 1 wherein said plurality of sorbent granules are cylindrical in shape.

5. An animal litter comprising:
   a plurality of sorbent granules each of said plurality of sorbent granules comprising granule particulate that is 90% by weight or more able to pass −20 screen sieve and a binder wherein greater than 90% of said granules have a size of between −5 and +60 screen sieve; an oil coating on each of said plurality of sorbent granules; and
   clumping agent particles decorating the surface of each of said plurality of sorbent granules.

6. The animal litter of claim 5 wherein said clumping agent is selected from the group consisting of: gum of guar, arabic, karaya, tragacanth or locust bean; celluloses of corn syrup, carboxymethylcellulose, ethylcellulose, hydroxyethylcellulose, hydroxy-methylethylcellulose, hydroxyethylpropylcellulose, methylhydroxyethyl-cellulose, or methylcellulose; starches of amylose, seagel, starch acetates, starch hydroxyethyl ethers, ionic starches, long-chain alkyl starches, dextrins, amine starches, phosphates starches, or dialdehyde starches; and plant starches of corn starch or potato starch.

7. The animal litter of claim 5 wherein said clumping agent is a gum.

8. The animal litter of claim 7 wherein said gum is guar gum.

9. The animal litter of claim 5 wherein said clumping agent has a size distribution such that greater than 90% of the clumping agent particles are −20 screen sieve or finer.

10. The animal litter of claim 5 wherein said granule particulate is selected from the group consisting of: corncob; bentonite; diatomaceous earth; attapulgite; montmorillonite; cellulosic plant stalks, husks and hulls.

11. The animal litter of claim 5 wherein said granule particulate is corncob.

12. The animal litter of claim 5 wherein said plurality of sorbent granules are cylindrical in shape.

* * * * *